(12) United States Patent
Balland et al.

(10) Patent No.: US 7,294,180 B2
(45) Date of Patent: Nov. 13, 2007

(54) GAS GENERATOR ASSEMBLY

(75) Inventors: Lionel Balland, Colombe (FR);
Philippe Jean, Grenoble (FR); Nicolas Schmutz, Grenoble (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 217 days.

(21) Appl. No.: 10/858,722

(22) Filed: Jun. 2, 2004

(65) Prior Publication Data

US 2004/0250681 A1 Dec. 16, 2004

(30) Foreign Application Priority Data

Jun. 2, 2003 (FR) ................................ 03 06608

(51) Int. Cl.
*B01D 53/04* (2006.01)
(52) U.S. Cl. .................................... 96/133; 128/205.27
(58) Field of Classification Search ................. 96/108, 96/121–133, 147; 95/96; 128/204.18, 205.12, 128/205.27–206.19
See application file for complete search history.

(56) References Cited

U.S. PATENT DOCUMENTS

| 4,378,982 | A | * | 4/1983 | McCombs | .................... | 96/117 |
| 4,509,959 | A | | 4/1985 | McCombs | | |
| 4,511,377 | A | * | 4/1985 | McCombs | .................... | 96/143 |
| 4,584,001 | A | | 4/1986 | Dechene | | |
| 5,366,541 | A | * | 11/1994 | Hill et al. | ...................... | 96/124 |
| 6,016,803 | A | | 1/2000 | Volberg et al. | | |
| 6,068,680 | A | * | 5/2000 | Kulish et al. | .................. | 95/98 |
| 6,343,591 | B1 | * | 2/2002 | Hara et al. | .................. | 123/519 |
| 2003/0167924 | A1 | * | 9/2003 | McCombs et al. | ............ | 96/121 |

OTHER PUBLICATIONS

French Search Report for FR 0306608, 2003.

* cited by examiner

*Primary Examiner*—Frank M. Lawrence
(74) *Attorney, Agent, or Firm*—Elwood Haynes

(57) ABSTRACT

A gas generator assembly, which is especially suited to both transportable and on-board oxygen generators, with at least one adsorbent and a buffer tank to store product gas separated from a feed gas mixture. In order to make the assembly squat and compact, the buffer tank may be of an annular or quadruple U shaped configuration. Such a buffer tank configuration may also provide the assembly with improved structural and protective attributes.

11 Claims, 2 Drawing Sheets

GAS GENERATOR ASSEMBLY

This application claims the benefit of priority under 35 U.S.C. § 119 (a) and (b) 1 to French Application No. 03 06608 filed Jun. 2, 2003, the entire contents of which are incorporated herein by reference.

BACKGROUND

The present invention relates to transportable and/or integrated gas generator assemblies.

Gas generators of the pressure swing adsorption type, generally denoted by the acronyms PSA or VSA, employ a tank for the product gas in order to eliminate or at least greatly reduce the fluctuations in the flow of product gas that are inherent to the pressure swing principle used in these generators.

In industrial plants, the adsorber and the product gas tank, both in the form of large cylinders, are placed side by side on foundations, as disclosed in U.S. Pat. No. 4,509,959. In autonomous or on-board assemblies, the adsorber and the tank, again in the form of cylinders, are paired, again side by side in or on a frame that incorporates the equipment, as disclosed for example in documents U.S. Pat. No. 4,584,001 and U.S. Pat. No. 4,511,377.

In the known prior art, the gas tanks produced maintain their conventional cylindrical bottle form, making complete integration of the gas generators difficult.

An object of the present invention is to propose an autonomous assembly of particularly compact and squat configuration, having a low weight, improved stability and greater reliability.

SUMMARY

The present invention relates to transportable and/or integrated gas generator assemblies, especially for the in situ production of oxygen-enriched gas mixtures, of the type comprising at least one absorber containing an adsorbent, in order to produce a gas separated from freed gas mixture, and a buffer tank for the product gas.

To do this, according to one feature of the invention, the tank is shaped so as to have at least one part forming an open internal space in which at least one part of the adsorber is placed.

According to other features of the invention:
the said part of the tank has a tubular structure typically produced from tubular components joined together, advantageously having, in projection in at least one plane, a U shape; and
the tank has an annular shape.

The present invention also relates to the use of such an assembly as an on-board oxygen and/or nitrogen generator.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
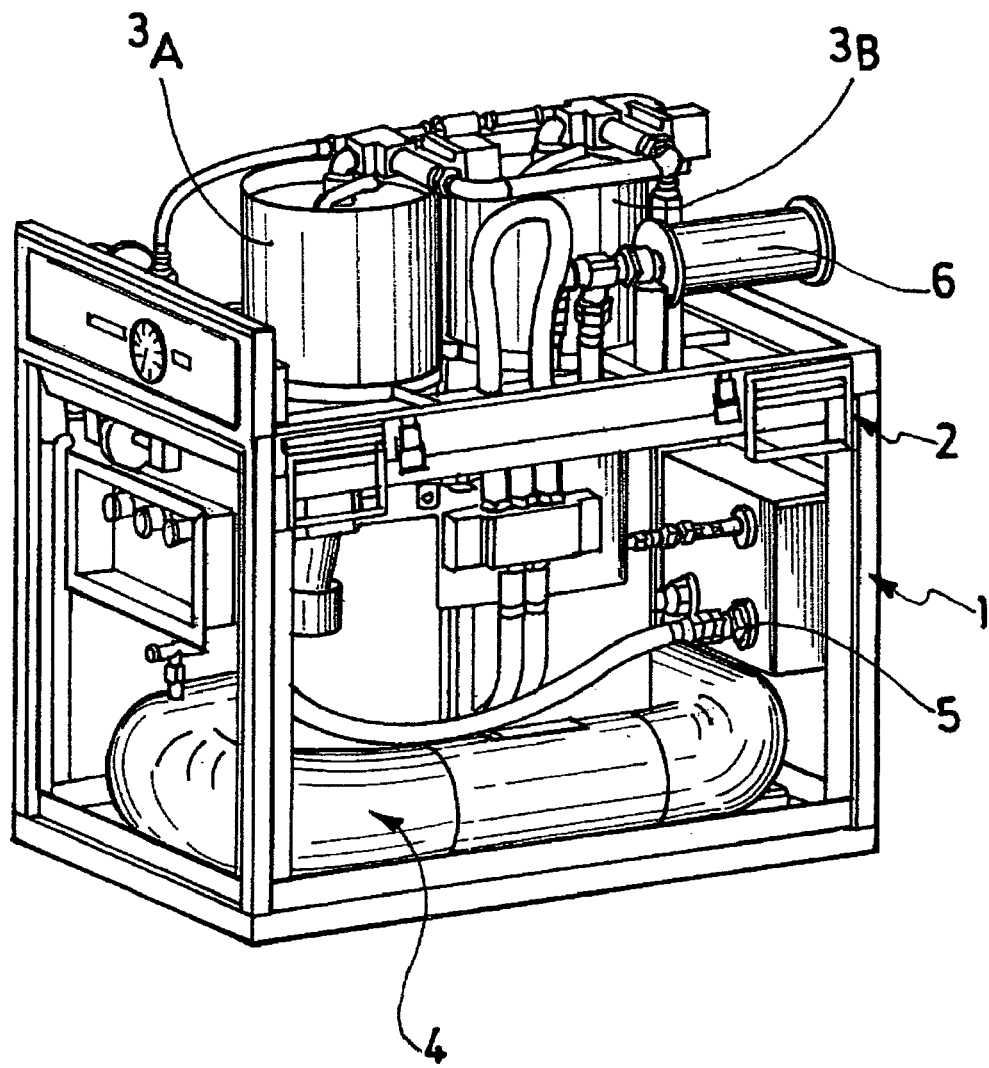
FIG. 1 illustrates one embodiment of a gas generator assembly, showing an annular shaped tank as according to the invention.

In the description that follows and in the drawings, identical or similar elements bear the same reference numbers.

FIG. 1 shows a transportable PSA oxygen concentrator assembly comprising, in a frame 1, typically occupying a volume of 0.6 to 1 $m^3$, for an overall weight of the concentrator of about 110 kg, provided with handles 2, for handling and transporting the assembly, two adsorbers 3A and 3B that can be connected to a source of compressed air under pressure via an inlet line 5 and deliver, via a production oxygen buffer tank 4, oxygen with a purity of greater than 92%, typically greater than 94%, to a user output connector (not visible in the figure) the waste gas mixture depleted in oxygen being discharged to the outside via a muffler 6.

According to one aspect of the invention, in this embodiment the tank 4 has an elongate annular shape, produced by joining shaped metal tubular elements end to end, having a diameter of between 100 and 250 mm, said tank 4 being mounted horizontally on the base of the frame 1 and defining, on the inside, a space open to the top and to the bottom, in which space the bases of the adsorbers 3A and 3B are placed and fixed together, in a large-capacity assembly conferring increased strength on all the elements placed in the frame 1. Depending on the uses, the frame 1 can be furnished with insulating and/or fluid tight panels.

Figure 2:
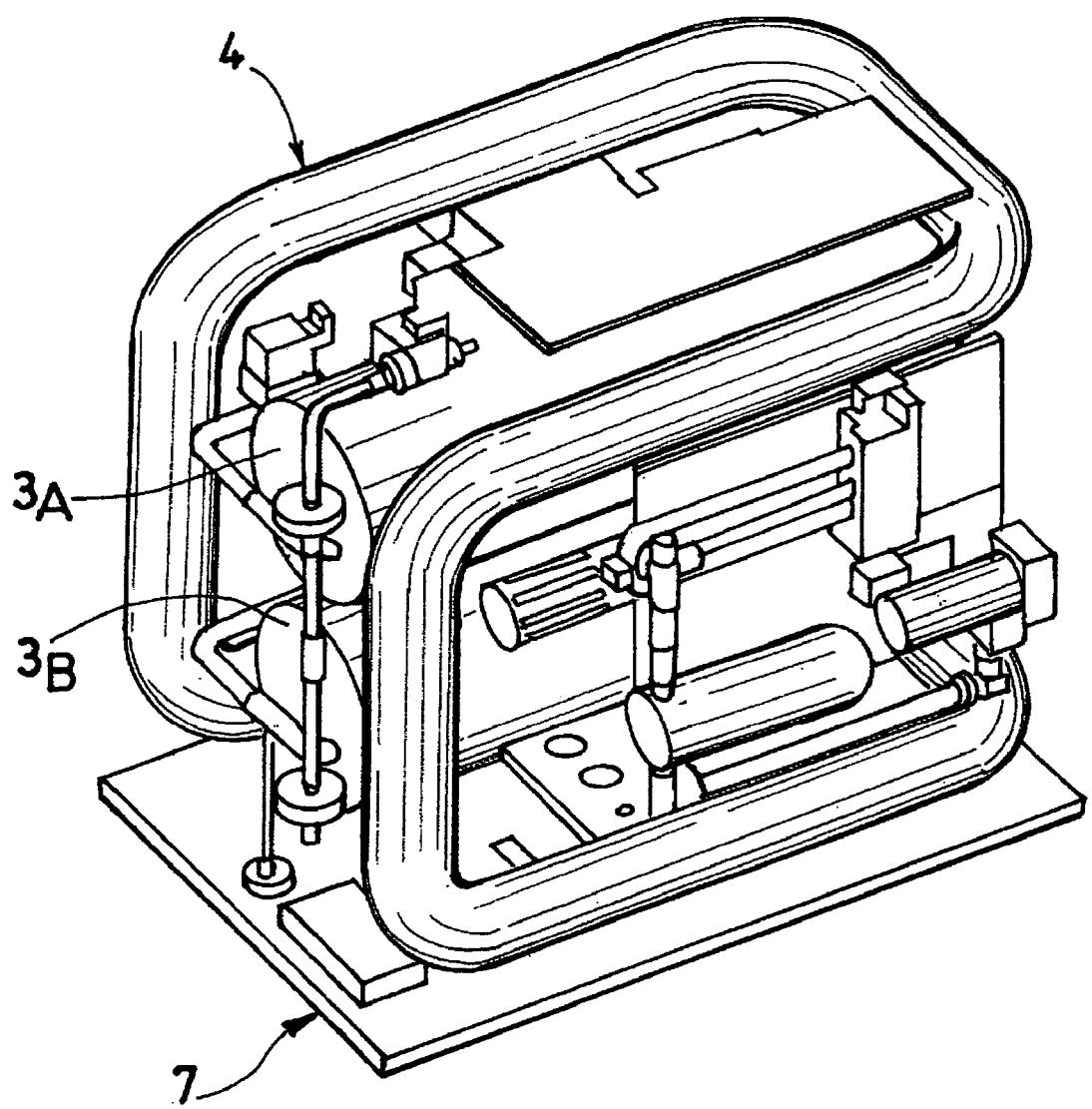
FIG. 2 illustrates a perspective view of one embodiment of a gas generator assembly, showing a tank with a quadruple U shape, as according to the invention.

In the embodiment shown in FIG. 2, the assembly, which is smaller than the previous one, is mounted on a support plate 7, generally oriented vertically in use, and the buffer tank 4 here has a quadruple U shape, formed by bending stainless steel tubes of less than 12 cm in diameter, which are joined end to end with two open Us in one direction and parallel to a first plane, and two other open is in the opposite direction and parallel to a second plane orthogonal to the first plane.

One of these Us is fixed via its branches to the support plate 7 and the adsorbers 3A, 3B, arranged so as to be parallel to the axis of intersection of said planes of the Us, the pipework and the main equipment items are all placed in the open volume on the six faces inscribed within the Us of the tank 4.

In this embodiment, the tank 4 itself fulfills the function of a protective self-supporting frame for the assembly, and the weight of the assembly, with two adsorbers incorporating a high-capacity adsorbent, may be brought down to below 50 kg.

The generator assemblies according to the invention are most particularly suitable for the production of oxygen using suitable adsorbents, typically of the zeolite type, in the form of transportable and mobile on-site oxygen generators for medical applications or in the form of on-board generators in aircraft for delivering oxygen to the crew and/or passengers of these aircraft.

Although the invention has been described in relation to particular embodiments, it is not limited thereby but is capable of modifications and variants that will be apparent to those skilled in the art within the context of the claims appended hereto.

It will be understood that many additional changes in the details, materials, steps and a arrangement of parts, which have been herein described in order to explain the nature of the invention, may be made by those skilled in the art within the principle and scope of the invention as expressed in the appended claims.

The invention claimed is:

1. A gas generator assembly apparatus comprising:
   a) at least one adsorber; and
   b) a product gas buffer tank wherein said tank has a continuous internal surface defining an internal product gas buffer volume and a continuous outer surface surrounding at least one part of said adsorber, wherein said at least one part is not contained within said product gas buffer volume.

2. The apparatus of claim 1, wherein said tank comprises tubular components joined together.

3. The apparatus of claim 2, wherein said tank comprises a U shaped projection in at least one plane.

4. The apparatus of claim 3, wherein said tank comprises a generally annular shape.

5. The apparatus of claim 3, wherein said tank comprises a quadruple U shape.

6. The apparatus of claim 1, wherein said tank comprises a structural element for at least one item of said assembly.

7. The apparatus of claim 1, wherein said assembly is:
   a) autonomous;
   b) transportable; and
   c) capable of producing oxygen.

8. The apparatus of claim 1, wherein said assembly is:
   a) autonomous;
   b) transportable;
   c) capable of producing oxygen; and
   d) the weight of the total assembly is less than about 50 kg.

9. The apparatus of claim 2, wherein said assembly is:
   a) autonomous;
   b) transportable;
   c) capable of producing oxygen; and
   d) the diameter of the tubular elements is between about 100 mm to about 250 mm.

10. The apparatus of claim 2, wherein said assembly is:
    a) autonomous;
    b) transportable;
    c) capable of producing oxygen; and
    d) the diameter of the tubular elements is less than 120 mm.

11. A gas generator assembly apparatus comprising:
    a) at least one adsorber; and
    b) a product gas buffer tank wherein said tank has a continuous internal surface defining an internal product gas buffer volume and a continuous outer surface surrounding at least one part of said adsorber, wherein said tank has at least a first portion extending along a first axis, a second portion extending along a second axis, and a third portion extending along a third axis, said first portion being joined to said second portion, said second portion being joined to said third portion, wherein said first and second axes extend in different directions and said second and third axes extend in different directions.

* * * * *